US007636790B1

(12) United States Patent
Parker et al.

(10) Patent No.: US 7,636,790 B1
(45) Date of Patent: Dec. 22, 2009

(54) SERVICE-BASED NETWORK PACKET ROUTING REDIRECTION USING AN ADDRESS SERVER

(75) Inventors: Benjamin J. Parker, Overland Park, KS (US); Shane W. Werner, Olathe, KS (US); Charles Diaz, Overland Park, KS (US); Terry M. Frederick, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2262 days.

(21) Appl. No.: 10/054,539

(22) Filed: Oct. 25, 2001

(51) Int. Cl.
*G06F 15/173* (2006.01)
*G06F 15/16* (2006.01)

(52) U.S. Cl. ...................... 709/245; 709/238

(58) Field of Classification Search ................. 709/238, 709/239, 242, 245
See application file for complete search history.

(56) References Cited

U.S. PATENT DOCUMENTS

| 5,852,721 | A | * | 12/1998 | Dillon et al. | 709/217 |
|---|---|---|---|---|---|
| 6,119,160 | A | | 9/2000 | Zhang et al. | |
| 6,119,165 | A | * | 9/2000 | Li et al. | 709/229 |
| 6,212,561 | B1 | * | 4/2001 | Sitaraman et al. | 709/225 |
| 6,253,327 | B1 | * | 6/2001 | Zhang et al. | 713/201 |
| 6,425,003 | B1 | * | 7/2002 | Herzog et al. | 709/223 |
| 6,678,733 | B1 | * | 1/2004 | Brown et al. | 709/229 |
| 6,732,179 | B1 | * | 5/2004 | Brown et al. | 709/229 |
| 6,769,031 | B1 | * | 7/2004 | Bero | 709/245 |
| 2002/0069241 | A1 | * | 6/2002 | Narlikar et al. | 709/203 |

OTHER PUBLICATIONS

RAD Data Communications, "DNS", May 5, 1999, Web Page, Archived by the Internet Archive Wayback Machine, Available at: http://web.archive.org/web/19990505010206/http://www.rad.com/networks/1998/dns/main.html.*

* cited by examiner

*Primary Examiner*—Aaron Strange

(57) ABSTRACT

A network apparatus includes a plurality of service-option resources, each resource having a respective numerical network address. An address server stores the numerical network addresses together with a respective logical name corresponding to each numerical network address. The address server responds to queries by providing a numerical network address corresponding to a logical name contained in a respective query. A plurality of service selection gateways are coupled to the service-option resources and the address server. Each service selection gateway 1) receives user traffic from a respective user directed to a nominal destination, 2) determines if the nominal destination should be redirected to a respective logical name corresponding to one of the service-option resources in response to a respective user profile, and 3) queries the address server for a respective numerical network address to redirect according to the respective logical name.

15 Claims, 7 Drawing Sheets

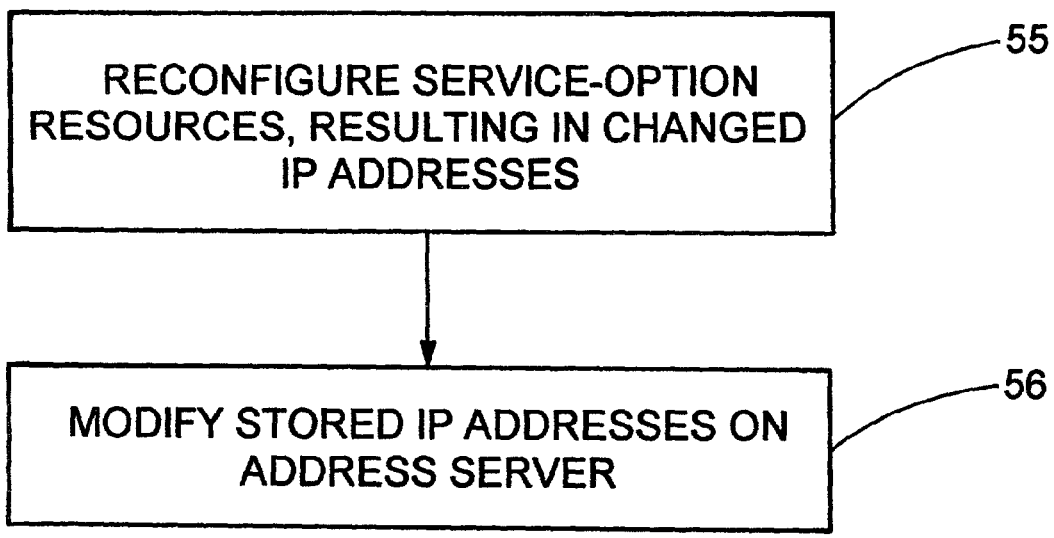

ADDRESS SERVER TRANSLATION TABLE http://Sprint.fire1.com=aaa.aaa.aaa.aaa
http://Sprint.fire2.com=bbb.bbb.bbb.bbb
http://Sprint.VS1.com=ccc.ccc.ccc.ccc
http://Sprint.tel1.com=ddd.ddd.ddd.ddd
http://Sprint.CA1.com=eee.eee.eee.eee
http://SprintCA2.com=fff.fff.fff.fff
http://Sprint.CA3.com=ggg.ggg.ggg.ggg

FIG. 6

RECONFIGURE SERVICE-OPTION RESOURCES, RESULTING IN CHANGED IP ADDRESSES

MODIFY STORED IP ADDRESSES ON ADDRESS SERVER

FIG. 8

SERVICE-BASED NETWORK PACKET ROUTING REDIRECTION USING AN ADDRESS SERVER

BACKGROUND OF THE INVENTION

The present invention relates in general to providing computer networking services with optional service features or resources, and, more specifically, to redirecting traffic from a user in response to authorized services accessible to the user.

In a typical computer network, most types of communication depend upon unique addresses assigned to specific hardware components on the network. The address of an intended recipient is included in each packet or datagram transmitted within the network so that the recipient can recognize and process transmissions intended for it. A full address may include a network address portion, a hardware or host portion, and a port identification.

Computer network service providers operate local or wide area networks to which their customers connect by dial-up, digital subscriber line (DSL) service, or cable modem, for example. The service provider's network includes a hub or gateway that functions as a concentrator or aggregator connected to a plurality of remote users. The gateway routes user traffic to destinations in the local network or to an external network, such as the Internet. The gateway often functions as a service selection gateway (SSG) which allows users to connect to various subscribed, on-demand network services. These subscription services may include a walled garden having various content servers, video on-demand servers, and voice services, or may include a firewall for handling all traffic between the user and the Internet, for example.

Network addresses, whether within a local area network or over interconnected networks, follow a specific protocol such as Internet Protocol (IP) addressing, which is part of the Transmission Control

BACKGROUND OF THE INVENTION

The present invention relates in general to providing computer networking services with optional service features or resources, and, more specifically, to redirecting traffic from a user in response to authorized services accessible to the user.

In a typical computer network, most types of communication depend upon unique addresses assigned to specific hardware components on the network. The address of an intended recipient is included in each packet or datagram transmitted within the network so that the recipient can recognize and process transmissions intended for it. A full address may include a network address portion, a hardware or host portion, and a port identification.

Computer network service providers operate local or wide area networks to which their customers connect by dial-up, digital subscriber line (DSL) service, or cable modem, for example. The service provider's network includes a hub or gateway that functions as a concentrator or aggregator connected to a plurality of remote users. The gateway routes user traffic to destinations in the local network or to an external network, such as the Internet. The gateway often functions as a service selection gateway (SSG) which allows users to connect to various subscribed, on-demand network services. These subscription services may include a walled garden having various content servers, video on-demand servers, and voice services, or may include a firewall for handling all traffic between the user and the Internet, for example.

Network addresses, whether within a local area network or over interconnected networks, follow a specific protocol such as Internet Protocol (IP) addressing, which is part of the Transmission Control Protocol/Internet Protocol (TCP/IP) suite. When a service selection gateway receives traffic from a user, it must direct that traffic according to 1) a user service profile that identifies the services to which the user has subscribed and 2) the requested service or destination implicit within the traffic received from the user. If the user is authorized to use the particular service, then the service selection gateway routes the corresponding user packets to the appropriate service by inserting the correct IP address for the service into the packets. Since any initial destination address may be replaced, this process is called redirection.

Prior art service selection gateways have had to be configured with the IP address corresponding to each service or host to which user traffic is to be redirected. Therefore, whenever the network resources are changed (e.g., adding or deleting services, or replacing host equipment), the service selection gateway must be manually reconfigured. This is especially burdensome for larger networks using many concentrators/service selection gateways accessing the services.

SUMMARY OF THE INVENTION

The present invention has the advantage of avoiding the foregoing problems of manually reconfiguring each service selection gateway when an IP address associated with a particular service or host changes.

In one aspect of the invention, a network apparatus comprises a plurality of service-option resources each having a respective numerical network address. An address server stores the numerical network addresses together with a respective logical name corresponding to each numerical network address. The address server responds to queries by providing a numerical network address corresponding to a logical name contained in a respective query. An authorization server stores respective user profiles for identifying service-option resources to which each one of a plurality of users are authorized to use. A plurality of service selection gateways are coupled to the service-option resources, the address server, and the authorization server. Each service selection gateway 1) receives user traffic from a respective user directed to a nominal destination, 2) determines if the nominal destination should be redirected to a respective logical name corresponding to one of the service-option resources in response to a respective user profile, and 3) queries the address server for a respective numerical network address to redirect according to the respective logical name.

BRIEF DESCRIPTION OF THE DRAWINGS

FIG. 6 shows contents of an address server translation table.

FIG. 8 is a flowchart showing a network reconfiguration method associated with network hardware changes.

DETAILED DESCRIPTION OF PREFERRED EMBODIMENTS

Figure 1:
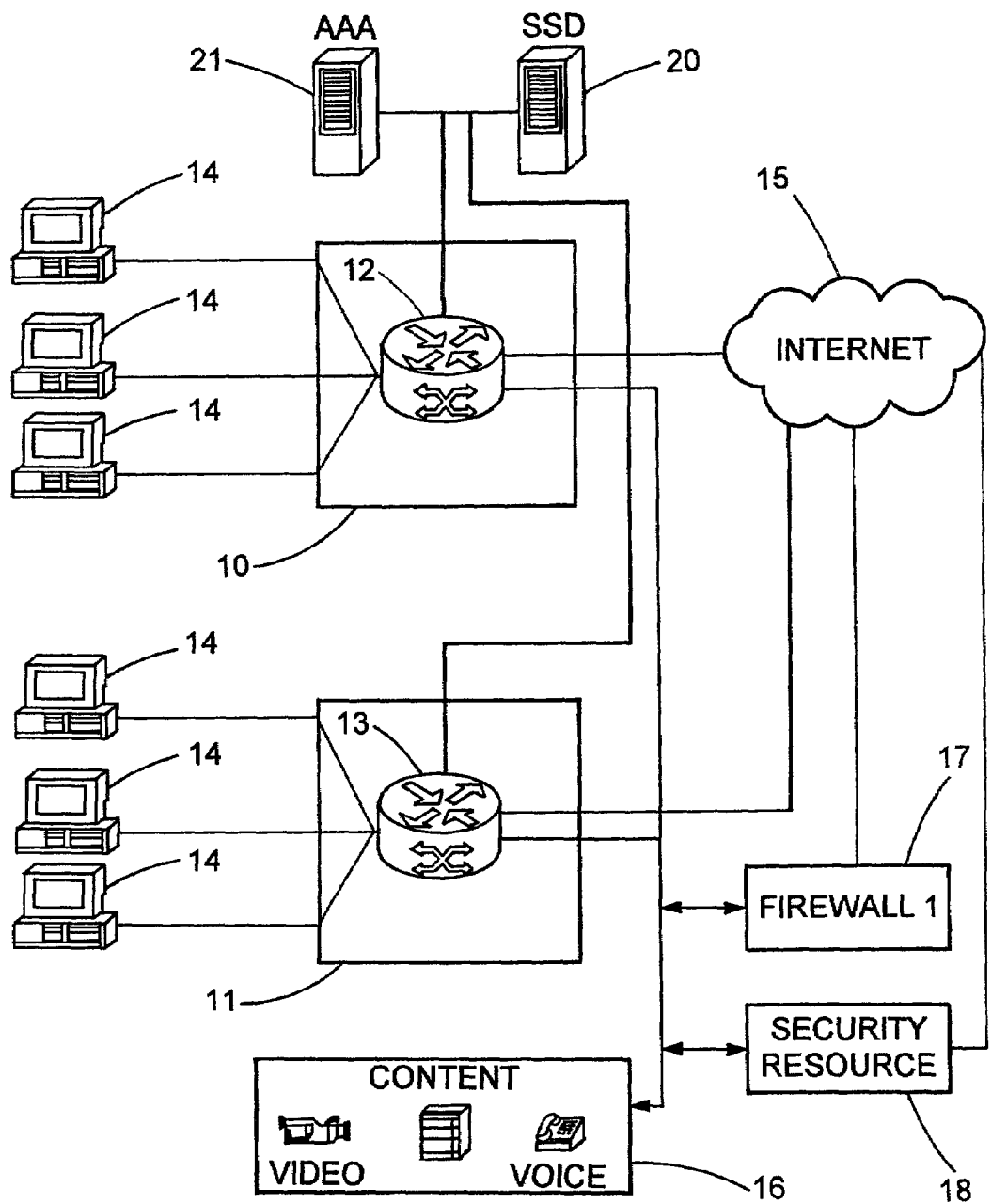
FIG. 1 is a block diagram showing a subscription services network architecture for an internet services provider.

Referring to FIG. 1, a system architecture for a network service provider is partially shown. One example of a commercially available service of this type is the Integrated On-Demand Network (ION) operated by Sprint Communications.

The local network of the service provider includes a number of hubs or gateways, including gateways 10 and 11. Each hub includes a concentrator or aggregator 12 and 13, respectively, which are connected to respective groups of remote users 14 (e.g., residential or business users). Remote users 14 may be connected to hubs 10 and 11 via dial-up, digital-subscriber line (DSL), cable modem, fiber optic, wireless, or a combination of these or other methods. Each remote user communicates either point-to-point or bridged with concentrators 12 and 13. Concentrators 12 and 13 route the aggregated user traffic to other destinations in the local network or to an external network, such as the Internet 15. Concentrators 12 and 13 may for example each be comprised of a Cisco 6400 Carrier-Class Broadband Aggregator.

Concentrators 12 and 13 each include a service selection gateway (SSG) which allows users to subscribe to various on-demand network services. These subscription services may include a walled garden 16 having various content servers, video on-demand servers, and voice services, for example. The subscription services may also include a firewall 17 or another security resource 18 to interface all of an authorized user's traffic with Internet 15. Security resource 18 can comprise a virus scanner or a content filter, for example.

The service selection gateway works together with a service selection dashboard (SSD) 20 and an authentication, authorization, and accounting (AAA) server 21. SSD 20 functions as an http-based portal for a user to make optional service selections. Information identifying the selected services (including configuration and billing information) is stored by AAA server 21. When a user logs in and attempts access to subscription services, concentrators 12 and 13 consult AAA server 21 (e.g., via a remote authentication dial-in user service (RADIUS) protocol) to determine whether to connect the user with the desired service. A user service profile is usually then stored in concentrator 12 or 13 to respond to subsequent service requests for as long as the user remains connected to the network.

Figure 2:
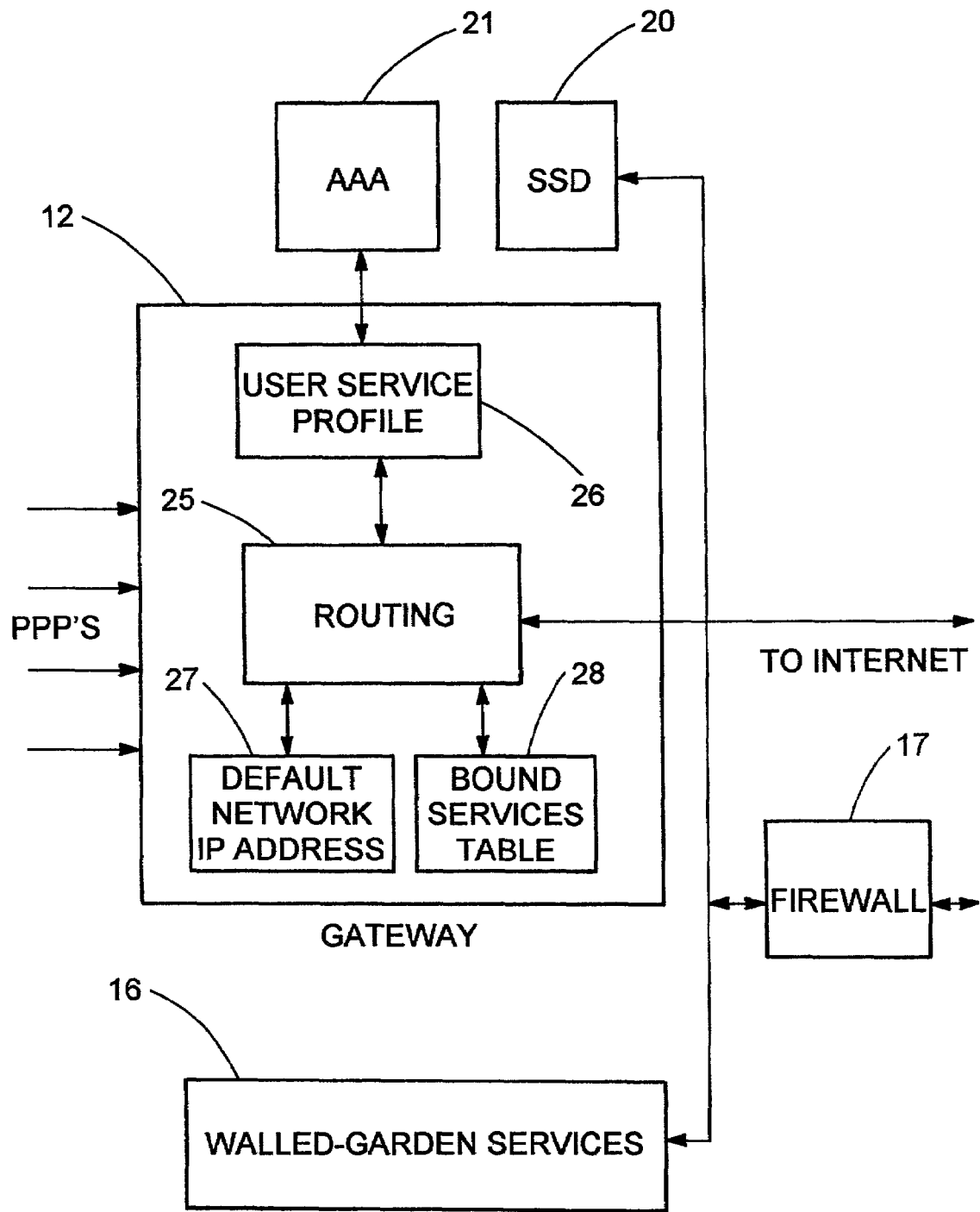
FIG. 2 is a block diagram showing a service selection gateway in greater detail.

Concentrator 12 is shown in greater detail in FIG. 2. A routing block 25 processes all point-to-point (PPP) user traffic received from a user and forwards it on to its next authorized destination. It also demultiplexes and forward to the user any traffic coming from the network destined for the user.

A memory 26 stores a user service profile for each user logged-on to the network. If a user is logging on for the first time, the new user is redirected to SSD 20. A memory 27 contains a default network IP address of SSD 20 which routing block 25 uses to perform the redirection. According to a conventional method, concentrator 12 responds to a configuration command that sets the contents of memory 27 to an IP address supplied in the configuration command. When the IP address of SSD 20 changes for any reason, then a new configuration command must be executed within concentrator 12 to update the IP address.

A memory 28 contains a bound services table which includes the IP addresses of all the valid resources within the local network, including subscription services such as walled-garden services or firewall services and non-subscription services such as a pass-through router to the Internet. Depending upon which services are shown to be subscribed in the user service profile, routing block 25 uses the bound service IP addresses to perform redirections to those services. Concentrator 12 includes appropriate configuration commands for manually setting the contents of memory 28 to the desired IP addresses. When the IP address of any bound service changes for any reason, then a new configuration command must be executed within concentrator 12 to update the IP address.

Figure 3:
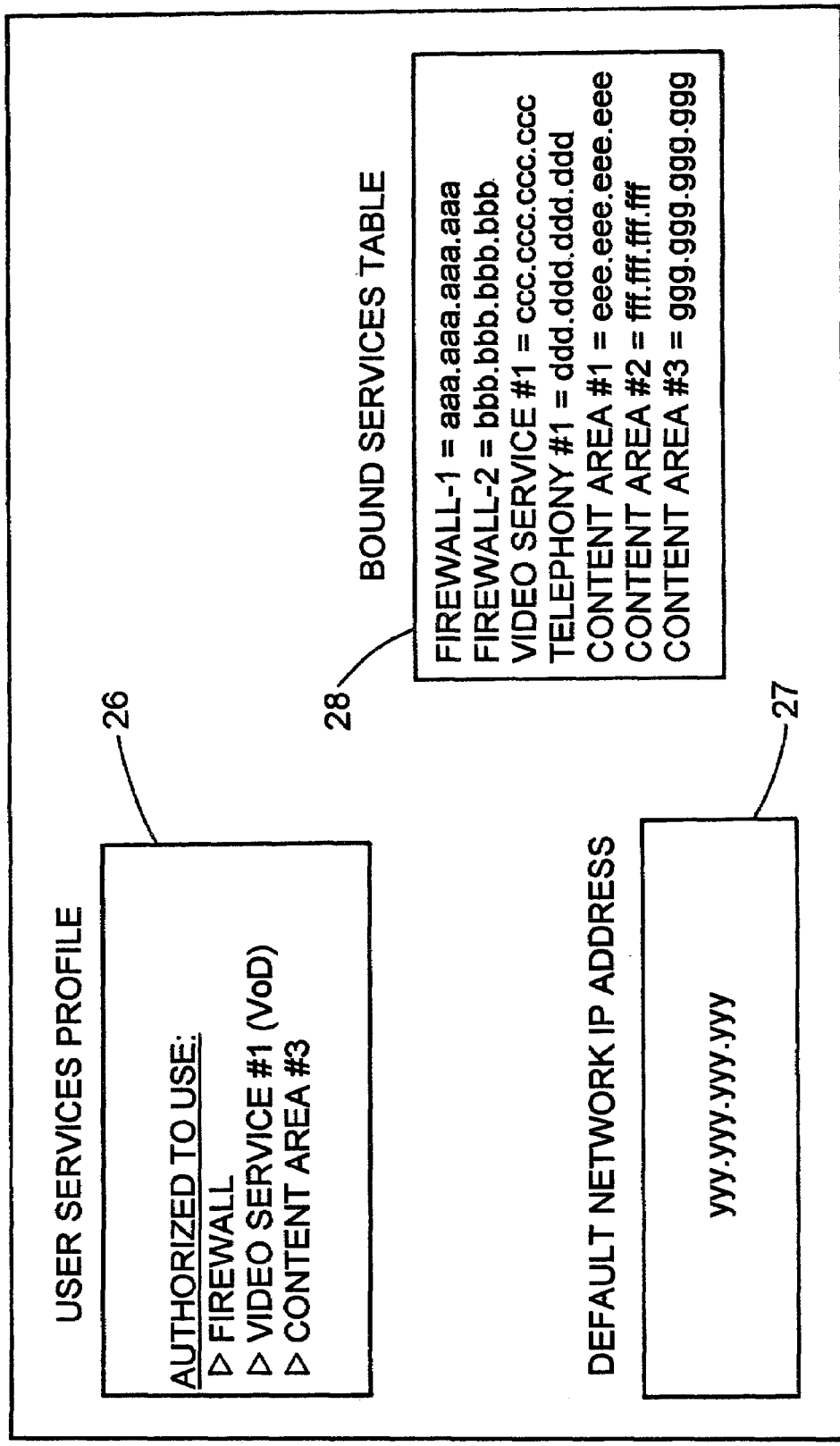
FIG. 3 shows specific configuration data using IP addresses.

FIG. 3 shows the configured memory contents in greater detail. The user services profile memory 26 identifies each user and lists each subscription service for which each corresponding user has signed up. Memory 27 contains the default network IP address in the form of "yyy.yyy.yyy.yyy" according to the TCP/IP protocol suite. Similarly, bound services table memory 28 stores each identified service name paired with the IP address of the network resource providing that service. When any of the IP addresses are changed, the corresponding entries in the bound services table for each concentrator's service selection gateway must be modified.

Figure 4:
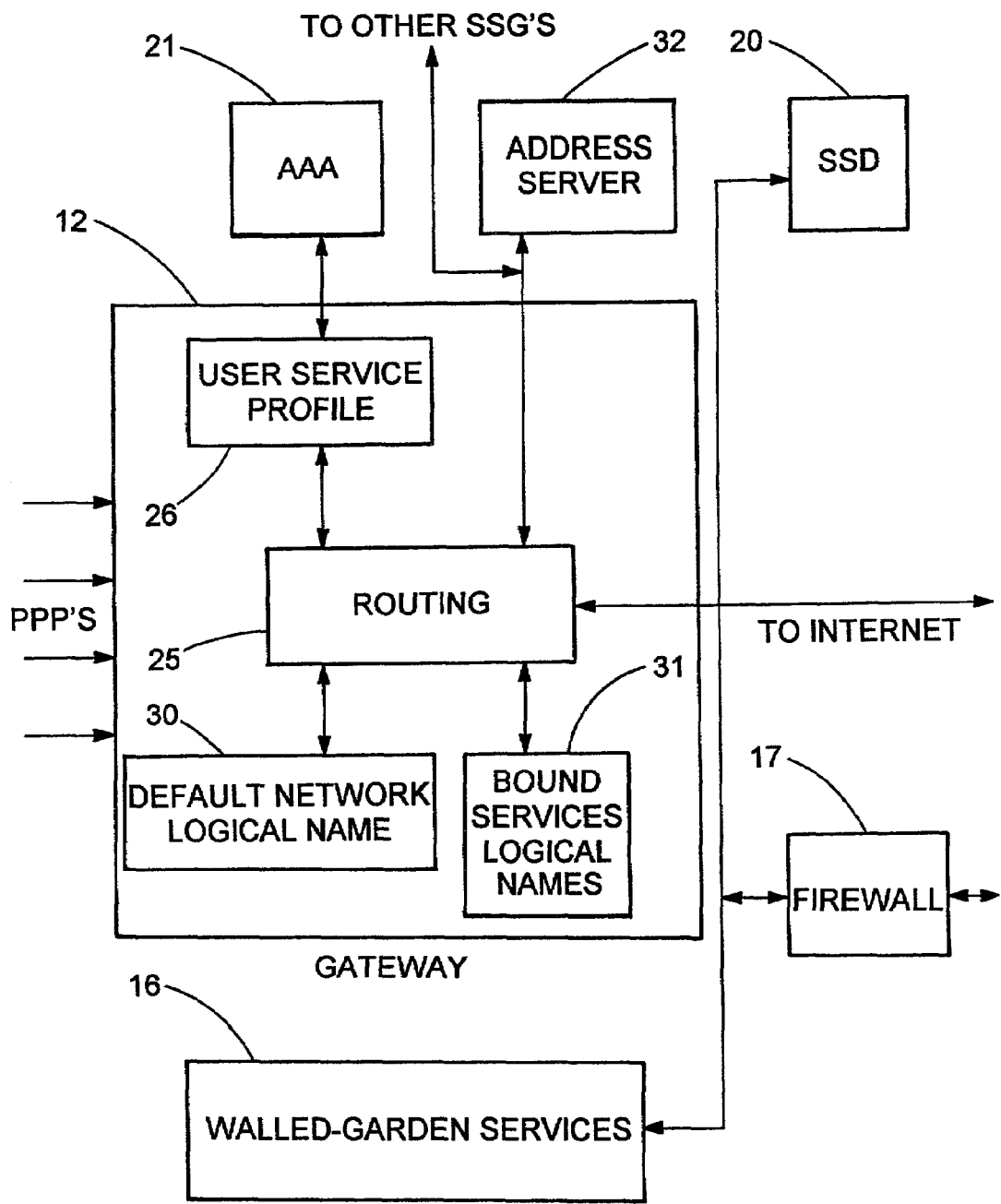
FIG. 4 is a block diagram showing a preferred embodiment using logical names and an address server for performing redirection according to the present invention.

The present invention circumvents the need to change IP addresses stored within each and every SSG by using a network architecture as shown in FIG. 4. Routing block 25 is connected to a memory 30 storing a default network logical name and to a memory 31 storing a table of bound services logical names. Logical names are textual labels which can be resolved or translated into a real IP address. Instead of actual IP addresses, the concentrator's service selection gateway is configured to store in memory all the predetermined logical names of service resources to which user traffic may be redirected.

In the preferred embodiment of the present invention, the translation is performed by an address server 32 which is connected to concentrator 12 and all the other concentrators in the local network that are performing SSG functions. Address server 32 stores the numerical IP addresses and a respective logical name corresponding to each IP address. Address server 32 responds to queries by sending an IP address corresponding to a logical name contained in a respective query from a router which is in the process of redirecting some user traffic to a particular destination. By serving the IP addresses of both the default network location and the bound services locations, changes to real IP addresses of the resources themselves to not result in an change within any of the SSG concentrators. All that is necessary is to update the corresponding IP address in address server 32.

Figure 5:
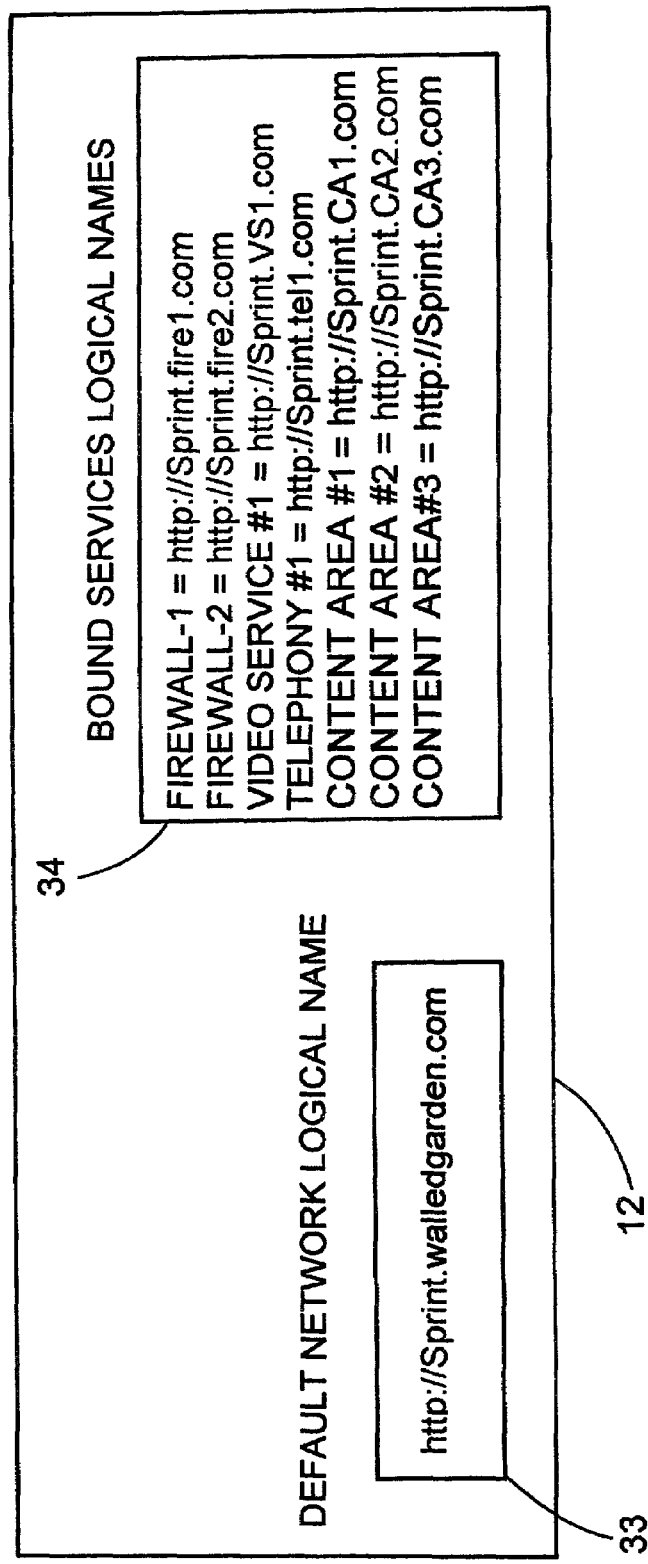
FIG. 5 shows specific configuration data of a preferred embodiment of the present invention using logical names.

FIG. 5 shows configured memory contents in concentrator 12 according to a preferred embodiment. A memory 33 contains a default network logical name, such as http://Sprint.walledgarden.com representative of the SSD resource for the local network. A memory 34 contains bound services logical names representative of each of the subscription and non-subscription resources to which an SSG will need to redirect user traffic. These logical names may preferably be in a domain name format. Address server 32 can thus be similar in structure to a domain name system (DNS) server.

FIG. 6 shows partial contents of a translation table 35 within address server 32 for associating logical names with numerical IP addresses.

Figure 7:
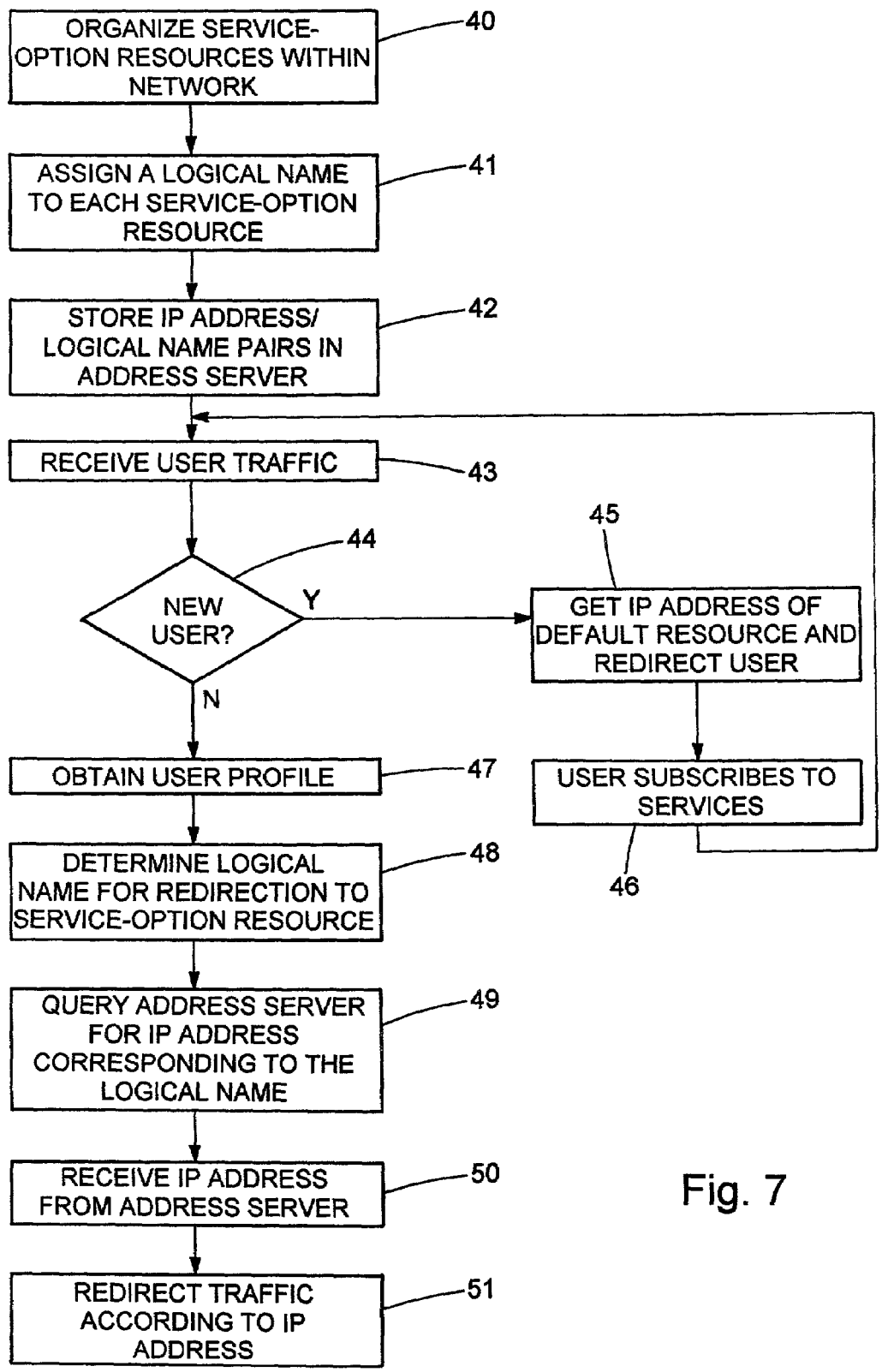
FIG. 7 is a flowchart showing a preferred method of the present invention.

FIG. 7 is a flowchart of a preferred method of the invention wherein service-option resources are organized for network access in step 40. In step 41, a logical name is assigned to each service-option resource. Preferably, each logical name is chosen to be an intuitive name for the service being represented, e.g., firewall1.com for a firewall resource. Using such intuitive names simplifies network administration and maintenance. In step 42, IP address/logical name pairs are stored in an address server translation table.

Once a network has been configured, user traffic is received in step 43. In step 44, a check is made to determine if this is a new user, and if it is a new user, then the SSG gets an IP address for the default network location (i.e., the IP address of the service selection dashboard) and redirects the user there. The SSG may preferably get the IP address of the default network location by retrieving its logical name and performing a look-up of the IP address using the address server. After the user is redirected to the SSD, the user subscribes to any desired services in step 46 and then returns to the normal flow at step 43.

If step 44 determines that it is not a new user, then the user service profile for the user is obtained in step 47. In response to 1) the nominal destination contained in a packet of the user traffic and 2) the service-options to which the user has subscribed, a logical name is determined in step 48 for redirecting the user traffic to the appropriate resource. For example, if the nominal destination is a node within the Internet and the user has subscribed to a firewall service, then the SSG determines that the traffic should be redirected to the logical name of http://Sprint.fire1.com, for example.

Based on the determined logical name, the address server is queried in step 49 for the IP address corresponding to the logical name. In step 50, the IP address is received by the SSG from the address server and the SSG redirects the traffic as appropriate in step 51.

Referring to FIG. 8, one of the primary advantages of the present invention lies in the ease with which network hardware changes can be accommodated. In step 55, service-option resources of a network are reconfigured, resulting in changed IP addresses of the resources assigned to particular services. For example, a content server in a walled garden may have been updated with a faster computer. In step 56, the stored IP addresses that have changed are stored on the address server associated with the corresponding logical names of the service they are to provide. The SSG continues to redirect packets to the correct IP address after the network modifications without requiring any changes in the SSG.

What is claimed is:

1. A network system comprising:
   a plurality of service-option resources each having a respective numerical network address;
   an address server storing said numerical network addresses and a respective logical name corresponding to each numerical network address, said address server responding to queries by providing a numerical network address corresponding to a logical name contained in a respective query;
   an authorization server storing respective user profiles for identifying service-option resources to which each one of a plurality of users are authorized to use; and
   a plurality of service selection gateways coupled to said service-option resources, said address server, and said authorization server, each service selection gateway 1) receiving user traffic from a respective user directed to a nominal destination, 2) determining if said user traffic directed to said nominal destination should be redirected to a respective logical name corresponding to one of said service-option resources in response to a respective user profile, and 3) querying said address server for a respective numerical network address for redirecting said user traffic according to said respective logical name.

2. The network system of claim 1 wherein said numerical network addresses are comprised of IP addresses.

3. The network system of claim 1 wherein said service-option resources include subscription services and wherein said network system further comprises a service selection dashboard through which said users obtain authorization for said subscription services.

4. The network system of claim 1 wherein said service-option resources include at least one firewall resource.

5. The network system of claim 1 wherein said service-option resources include at least one virus-scanning resource.

6. The network system of claim 1 wherein said service-option resources include at least one content-filtering resource.

7. The network system of claim 1 wherein said service-option resources include at least one walled-garden resource.

8. A method of forwarding user traffic in a computer network including a plurality of service-option resources each having a respective numerical network address, said method comprising the steps of:
   assigning a logical name corresponding to each of said numerical network addresses;
   storing each of said numerical network addresses with its respective logical name in an address server;
   storing respective user profiles for identifying service-option resources to which each one of a plurality of users are authorized to use;
   receiving at a service selection gateway user traffic from a user in the form of a packet having a nominal destination;
   determining a respective logical name to which said packet should be redirected in response to a respective user profile;
   said service selection gateway querying said address server for a respective numerical network address corresponding to said respective logical name;
   said address server responding with said respective numerical network address; and
   said service selection gateway redirecting said packet to said respective numerical network address.

9. The method of claim 8 wherein said numerical network addresses are comprised of IP addresses.

10. The method of claim 8 further comprising the step of directing said user to a service selection dashboard for configuring said user profile.

11. The method of claim 8 further comprising the steps of:
    reconfiguring said service-option resources, resulting in changed numerical network addresses; and
    modifying said stored numerical network addresses on said address server;
    whereby said service selection gateway continues to redirect said packets to a correct numerical network address after said reconfiguring step without requiring any changes to said service selection gateway.

12. The method of claim 8 wherein said service-option resources include at least one firewall resource.

13. The method of claim 8 wherein said service-option resources include at least one virus-scanning resource.

14. The method of claim 8 wherein said service-option resources include at least one content-filtering resource.

15. The method of claim 8 wherein said service-option resources include at least one walled-garden resource.

* * * * *

UNITED STATES PATENT AND TRADEMARK OFFICE
CERTIFICATE OF CORRECTION

PATENT NO. : 7,636,790 B1
APPLICATION NO. : 10/054539
DATED : December 22, 2009
INVENTOR(S) : Parker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2458 days.

Signed and Sealed this

Ninth Day of November, 2010

David J. Kappos
*Director of the United States Patent and Trademark Office*